United States Patent Office 2,955,558
Patented Oct. 11, 1960

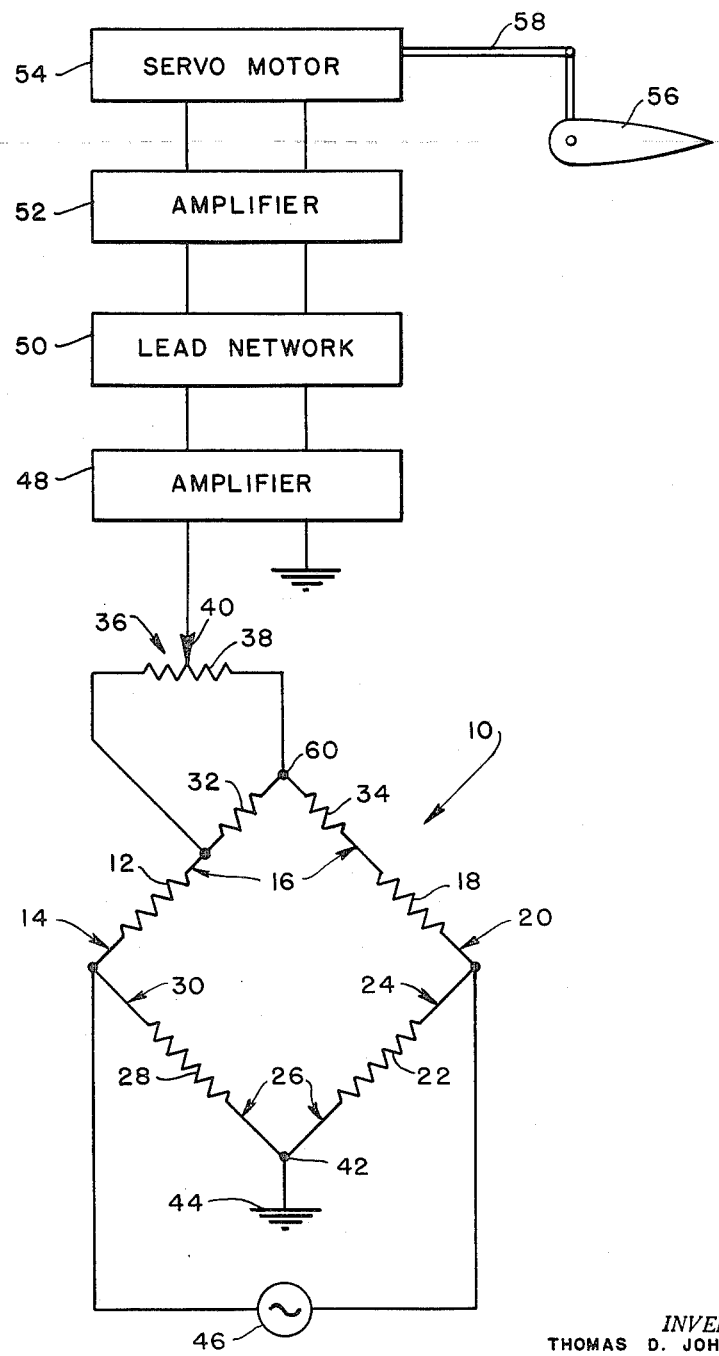

2,955,558

WIDE RANGE DEPTH CONTROL

Thomas D. Johnson, Lookout Mountain, Tenn., Leonard S. Jones and Stephen Kowalyshyn, Jr., Sharon, Pa., assignors, by mesne assignments, to the United States of America as represented by the Secretary of the Navy Filed Sept. 30, 1954, Ser. No. 459,566

3 Claims. (Cl. 114—25)

This invention relates to depth control systems of a torpedo and in particular to a wide range depth control which is suitable for use in depths down to 1000 feet below sea level.

Modern submarines have been improved to the point where they are now capable of operating at depths of 1000 feet below sea level. Since submarines can operate at such great depths, it is necessary that anti-submarine torpedoes likewise be capable of operating satisfactorily at such a depth.

The use of metal bellows which are exposed to the hydrostatic pressure of the sea as a component in the depth control systems of torpedoes has heretofore been conventional since the greatest depths to which such torpedoes normally operated did not exceed 500 feet below sea level. When a bellows type depth control system is used at depths down to 1000 feet below sea level, the bellows must be made so rigid to withstand the high pressures that errors due to hysteresis resulting from the rigidity of the bellows and friction in the moving parts lead to unacceptable inaccuracies. Further, bellows type depth controls designed for use at depths of 1000 feet below sea level become large, heavy, and more expensive.

It is, therefore, an object of this invention to provide a wide range depth control which is suitable for use in a torpedo at depths down to 1000 feet below sea level.

It is a further object to provide a wide range depth control for a torpedo which can accurately control the operating depth of a torpedo at any depth between sea level and 1000 feet below sea level.

It is another object of this invention to provide a wide range depth control for a torpedo which is accurate, light in weight, occupies a minimum in volume, and is relatively reasonable in cost.

Other objects and many of the attendant advantages of this invention will be readily appreciated as the same becomes better understood by reference to the following detailed description when considered in connection with the accompanying schematic diagram.

In the wide range depth control a strain gauge bridge 10 such as a slightly modified "Baldwin SR–4 pressure cell" which is capable of measuring pressures of from 0 to 500 pounds per square inch, for example, is used. Strain element 12 is located in branch 14 of arm 16 of the bridge. Thermal balancing resistor 18 is located in branch 20 of arm 16. Strain element 22 is located in branch 24 of arm 26 of the bridge 10, and thermal balancing resistor 28 is located in branch 30 of arm 26. The resistance of elements 12 and 22 and resistors 18 and 28 are substantially equal to each other and in a preferred embodiment they each have a resistance of approximately 117 ohms. The "Baldwin pressure cell" is modified by adding resistor 32 in series with element 12 of branch 14 and by adding resistor 34 in series with balance resistor 18 of branch 20. Resistors 32 and 34 have equal values of resistance that are quite small as compared with the value of the resistance of element 12, for example, the values of each in a preferred example being 0.25 ohm. A ten turn high resistance potentiometer 36 is connected so that its resistor 38 parallels resistor 32. The value of resistor 38 exceeds that of resistor 32 by such an amount as to make the equivalent resistance of the two resistors connected in parallel substantially equal the value of resistor 32. The movable contact 40 of potentiometer 36 may be positioned on resistor 38 by manual means, or by mechanical means, such as a suitable servo mechanism, if desired. Terminal 42, located between the branches 24, 30 of arm 26, is connected to ground 44. Four hundred cycle alternating current from source 46 is applied across arms 16, 26 of bridge 10. The voltage existing between terminal 42 and contact 40, subsequently referred to as the error voltage, is amplified by conventional amplifier 48, and modified by lead network 50 to produce a suitable lead voltage. Such a network is described in U.S. application No. 334,818, filed February 3, 1953, by Thomas D. Johnson and Martin G. Sateren, now Patent No. 2,785,306, and entitled "A Lead Network for Servo-Mechanisms with A.C. Carrier Voltage." The lead voltage of network 50 is amplified by conventional servo amplifier 52 and is used by conventional servo motor 54 to position the depth steering elevator 56 of a torpedo by mechanical linkage 58.

The strain elements 12 and 22 of bridge 10 are subjected to stretching by the hydrostatic pressure of the sea at the depth of the torpedo. At zero depth, bridge 10 is balanced so that no potential difference will exist between terminal 42 and terminal 60 which is located between branches 14 and 20 of arm 16. As the depth of the torpedo in the sea increases, the resistance of elements 12 and 22 increase so that an alternating potential difference exists between terminals 42 and 60. The error signal that is applied to amplifier 48, however, is the potential difference that exists between contact 40 of potentiometer 36 and terminal 42. The magnitude of the error signal depends on the position of contact 40 on resistor 38 of potentiometer 36 and the potential difference between terminals 42 and 60 due to the hydrostatic pressure of the sea causing changes in the resistance of elements 12 and 22. The setting of the potentiometer, that is, the position of contact 40 on resistance 38 of potentiometer 36, determines the depth at which the torpedo will operate, that is, the zero error signal depth to which the torpedo will be brought and at which it will be substantially maintained by action of the described depth control. In an actual embodiment of the above-described arrangement, for example, wherein a depth change of one thousand feet will increase the resistance of strain elements 12 and 22 by say 0.25 ohm, and wherein a ten turn potentiometer is used, a change of 3.6° in the position of contact 40 will correspond to a change in control depth of one foot. The position of contact 40 on resistor 38 may thus be readily adjusted to establish the desired depth at which the torpedo will operate.

The magnitude of the error voltage is determined by the difference between the depth of the torpedo and a predetermined depth corresponding to the position of contact 40 on resistor 38. The phase of the error voltage which is either in phase or 180° out of phase with the voltage from source 46 indicates the direction of the difference. In a given embodiment, for example, if the error voltage is in phase with source 46, this could mean that the torpedo is above the desired depth, and if the error voltage is out of phase, then the torpedo is below the desired depth.

The error voltage in the described system has a relatively small amplitude and it is therefore amplified by amplifier 48. The amplified error voltage, however, is sometimes not fully suitable for direct use in a control system since the system might then be unstable. To prevent instability, the error voltage is modified by lead network 50 to produce a lead voltage which is suitable to control a servo-motor to reduce the depth error, or difference between the actual depth of the torpedo and the predetermined depth corresponding to the setting of the contact 40 of potentiometer 36, with a minimum of oscillation and hunting. The lead voltage produced by network 50 is amplified by a conventional servo-amplifier 52 to satisfactory level for controlling a conventional servo motor 54. Servo-motor 54 operates by means of a mechanical linkage 58 to change the orientation of elevator 56 and control the operating depth of the torpedo. The depth control system operates to continually correct the torpedo depth and reduce the error voltage to zero with the result that the torpedo operates at substantially a predetermined depth corresponding to the setting of potentiometer 36.

The several components of the control system, in particular the strain gauge bridge 10 and potentiometer 36, amplifier 48, network 50 and amplifier 52, may of course be miniaturized, thus yielding a depth control system which is not only accurate over the range of from 0 to 1000 feet below sea level but which occupies a minimum volume and has a minimum weight so that the system is very desirable for use in torpedoes.

Obviously many modifications and variations of the present invention are possible in the light of the above teachings. It is therefore to be understood that within the scope of the appended claims the invention may be practiced otherwise than as specifically described.

What is claimed is:

1. In a torpedo having depth steering means, the improvements comprising a strain gauge bridge having a first and second arm, each arm having two branches, resistor elements in each branch, two of the resistors in oppositely located branches of the two arms adapted to vary as a function of the hydrostatic pressure to which the torpedo is subjected, each branch of the first arm including an additional resistor, said additional resistors having equal resistance, a potentiometer connected in parallel with one of the additional resistors, means for applying an alternating current of substantially constant voltage across the two arms, whereby the phase and amplitude of an error voltage existing between a contact arm of the potentiometer and a point between the arms of the second branch is a function of the position of the contact arm of the potentiometer and the depth of the torpedo, and means responsive to the error voltage for controlling the depth steering means of the torpedo to cause the torpedo to operate at a depth where said error voltage is minimized.

2. In a torpedo as defined in claim 1 in which the means responsive to the error voltage for controlling the depth steering means of the torpedo comprises means for amplifying the error voltage, means for modifying the error voltage to produce a lead voltage, means for amplifying the lead voltage, and means responsive to the amplified lead voltage to control the depth steering means.

3. For use in a torpedo having depth steering surfaces and deflecting mechanism therefor adapted to be operated in response to and in accordance with control signals applied thereto, apparatus for providing said control signals, said apparatus comprising an electrical bridge circuit adapted to provide depth error signals having characteristics corresponding to the sense and magnitude of departures of the torpedo from a preselected depth at which a predetermined hydrostatic pressure occurs, said bridge circuit including a depth-sensing member, characterized by an electrical impedance which increases in response to strain produced by hydrostatic pressure to which the torpedo is exposed, and a potentiometer which is initially adjustable to provide an error signal null condition when said predetermined pressure is experienced, means for converting said error signals to provide control signals suitable for operating said deflecting mechanism to effect depth control of the torpedo at said preselected depth, and means for imparting to said control signals characteristics suitable for effecting stabilized depth control of the torpedo at said preselected depth.

References Cited in the file of this patent

UNITED STATES PATENTS

| | | |
|---|---|---|
| 2,414,449 | Chapin | Jan. 21, 1947 |
| 2,417,768 | Leonard | Mar. 18, 1947 |
| 2,472,045 | Gibbons | May 31, 1949 |
| 2,573,286 | Statham | Oct. 30, 1951 |
| 2,580,512 | Broadbent | Jan. 1, 1952 |
| 2,688,727 | Ruge | Sept. 7, 1954 |